United States Patent
Park et al.

(10) Patent No.: US 6,957,501 B2
(45) Date of Patent: Oct. 25, 2005

(54) CLOTHES DRYER AND METHOD FOR CONTROLLING OPERATION THEREOF

(75) Inventors: Young Hwan Park, Kwangmyong-shi (KR); Choon Myun Chung, Kwangmyong-shi (KR); Mu Yong Choi, Seoul (KR); Dae Yun Park, Kwangmyong-shi (KR); Kyung Seop Hong, Inchon-kwangyokshi (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 10/382,884

(22) Filed: Mar. 7, 2003

(65) Prior Publication Data

US 2004/0068889 A1 Apr. 15, 2004

(30) Foreign Application Priority Data

Oct. 10, 2002 (KR) .................................. 10-2002-0061837

(51) Int. Cl.$^7$ .................................................. F26B 3/00
(52) U.S. Cl. .............................. 34/446; 34/527; 34/549; 34/595
(58) Field of Search .......................... 34/446, 527, 549, 34/595, 82, 315

(56) References Cited

U.S. PATENT DOCUMENTS 5,361,511 A * 11/1994 Brown 6,032,494 A 3/2000 Tanigawa et al.

FOREIGN PATENT DOCUMENTS

| DE | 1 585 945 | 9/1969 |
|---|---|---|
| DE | 34 12 284 A1 | 10/1985 |
| DE | 42 16 106 A1 | 11/1993 |
| DE | 43 30 456 C1 | 3/1995 |
| DE | 198 42 644 A1 | 3/2000 |
| EP | 0 543 166 A1 | 5/1993 |
| EP | 0 997 571 A2 | 5/2000 |
| GB | 2 094 961 A | 9/1982 |

* cited by examiner

Primary Examiner—Henry Bennett
Assistant Examiner—Camtu Nguyen
(74) Attorney, Agent, or Firm—Birch, Stewart, Kolasch & Birch, LLP

(57) ABSTRACT

A clothes dryer and a method for controlling its operation are disclosed, in which the clothes dryer includes a second motor being separately driven from a drum or a circulation fan to control a cooling fan for cooling a condenser. As for the second motor, a variable speed motor is used and amount of heating of a heater of the clothes dryer is variable. In the method for controlling an operation of a clothes dryer, the cooling fan is operated when a predetermined period of time passes after the cooling fan being stopped during an initial operation, or the cooling fan is operated at a regular speed when a temperature of air circulating reaches a predetermined degree after the cooling fan being operated at a low speed during the initial operation of the clothes dryer. Also, the speed of the cooling fan is varied according to amount of heating of the heater.

7 Claims, 5 Drawing Sheets

CLOTHES DRYER AND METHOD FOR CONTROLLING OPERATION THEREOF

This nonprovisional application claims priority under 35 U.S.C. §119(a) on Patent Application No. 2002-61837 filed on KOREA on Oct. 10, 2002, which is herein incorporated by reference.

This application claims the benefit of the Korean Application No. P2002-61837 filed on Oct. 10, 2002, which is hereby incorporated by reference.

BACKGROUND OF THE INVENTION

1. Field of the Invention

The present invention relates to a clothes dryer, and more particularly, to a clothes dryer in which a hot blast is used to perform a dry process and moisture generated during the dry process is condensed into waterdrops so as to be discharged.

2. Discussion of the Related Art

Generally, a clothes dryer is an apparatus for automatically drying a dry object after a washing process. There are two different types of clothes dryers: a discharge type clothes dryer in which external air is introduced to perform a dry process and a condensation type clothes dryer in which internal air is circulated for the dry process and moisture is condensed into waterdrops to be discharged.

A condensation type clothes dryer of the related art will be described below in reference to the accompanying drawings.

FIG. 1 is a perspective view illustrating main parts of a condensation type clothes dryer of the related art. Referring to FIG. 1, the arrow 'I' indicates a flow passage of external air and the arrow 'II' indicates a flow passage of air circulating inside the clothes dryer.

As shown in FIG. 1, a condensation type clothes dryer of the related art includes a drum 1, a filter 2, a condenser 3, a circulation fan 5, a cooling fan 7, a heater (not shown), and a circulation duct (not shown).

At this time, the drum 1 is formed in a cylindrical shape and has a plurality of lifters (not shown) on its inner circumferential face. The drum 1 starts rotating by an action of a driving motor 4. For this end, as shown in FIG. 1, the drum 1 and driving motor 4 are connected to each other with a belt 6.

A filter 2 filters off such alien substances as lint particles from humid air being discharged from the inside of the drum 1. The humid air which passed through the filter 2 is condensed into waterdrops by the condenser 3, for which a heat exchange process between the humid air and external air is performed to eliminate moisture from the humid air. For this end, a cooling fan 7, in a circumferential direction, discharges the sucked external air through a duct 8 being connected to the condenser 3, thereby refrigerating the condenser 3.

The circulation fan 5 makes dry air of which moisture is eliminated flow into the drum 1 again. The heater heats the dry air before it flows into the drum 1. Although not shown, in the condensation type clothes dryer, the humid air after the dry process in the drum 1 is guided to orderly pass through the filter 2, the condenser 3, the circulation fan 5, and the heater, and finally, the air flows into the drum 1 again.

Generally, in the condensation type clothes dryer of the related art, the driving motor 4 is connected not only to the drum 1 but also to the cooling fan 7 and circulation fan 5.

When the dry process is started, by the operation of the driving motor 4, the drum 1, the cooling fan 7, and the circulation fan 5 are rotated simultaneously. Then, air inside the drum 1 is circulated by the action of the circulation fan 5. At this instance, the air initially circulated is not condensed by the condenser 3 because of its low temperature and low humidity state.

However, the clothes dryer of the related art results in a heat loss during the initial operation process of the clothes dryer as air heated by the heater is cooled down by the cooling fan 7 again.

Besides, as the cooling fan 7 is operated during the initial operation process of the clothes dryer during which the condensation does not occur, the driving motor 4 comes to have too much load.

SUMMARY OF THE INVENTION

Accordingly, the present invention is directed to a clothes dryer and a method for controlling its operation that substantially obviate one or more problems due to limitations and disadvantages of the related art.

An object of the present invention is to provide a clothes dryer and a method for controlling its operation that prevent heat and energy losses caused by the operation of a cooling fan during the initial operation process of the clothes dryer.

Another object of the present invention is to provide a clothes dryer and a method for controlling its operation that improve the dry efficiency of the clothes dryer by varying the amount of airflow cooling a condenser according to amount of heating of a heater.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a clothes dryer of the present invention includes a drum, a circulation duct, a condenser, a heater, a circulation fan, a first motor, a cooling fan, a second motor, and a controller. The drum is rotatably provided in a cabinet. The circulation duct connects an air inlet and outlet of the drum and forms an air circulation passage. The condenser is provided in the circulation duct to condense air being discharged from the drum. The heater is provided in the circulation duct to heat the air being circulated. The circulation fan is provided in the circulation duct to circulate air. The first motor rotates the drum and the circulation fan. The cooling fan provided on one side of the condenser cools the condenser. The second motor drives the cooling fan. The controller generates independent control signals to the first and second motors, respectively, so as to control operation of the circulation fan and the cooling fan independently.

At this time, as for the second motor, a variable speed motor is used. The heater is controlled to adjust its amount of heating. The heater is provided in a circulation duct adjacent to the inlet of the drum to heat the circulating air which passes through the condenser.

A lint filter for filtering off lint in the circulation duct and a temperature sensor for measuring the temperature of air in the circulation duct or drum are additionally provided.

A method for controlling an operation of a clothes dryer, including a circulation fan for circulating air and a cooling fan being separately driven to cool down a condenser includes processes of (1) simultaneously rotating the circulation fan and a drum and operating a heater in a state of the cooling fan being stopped and (2) beginning to rotat the cooling fan when a predetermined condition is met so as to delay operation of the condenser for improving dry efficiency.

At this instance, for the cooling fan to be rotated, one of the following conditions should be met: when a predetermined period X of time passes, or when the temperature of circulating air reaches a predetermined degree.

Also, amount of heating of the heater are varied. In this instance, when the amount of heating of the heater is the first set value (Q1) and less, the cooling fan is operated at a low speed. When the amount of heating of the heater is the second set value (Q2) and more, the cooling fan is operated at a high speed. Lastly, when the amount of heating is between the first and second set values (Q1 and Q2), the cooling fan is operated at a regular speed.

In another aspect of the present invention, a method for controlling an operation of a clothes dryer of the present invention, including a circulation fan for circulating air and a cooling fan being separately operated to cool down a condenser, includes processes of (1) simultaneously rotating the circulation fan for circulating air and a drum, and operating a heater for heating the air, and (2) beginning to operate the cooling fan at a regular speed when a predetermined condition is met so as to delay operation of condenser for improving dry efficiency.

In further another aspect of the present invention, a method for controlling an operation of a clothes dryer of the present invention, including a circulation fan for circulating air and a cooling fan being separately operated to cool down a condenser, includes a processes of (1) operating a cooling fan at a low speed when an amount of heating of a heater is a first set value (Q1) and less; (2) operating the cooling fan at a high speed when the amount of heating of the heater is the second set value (Q2) and more. At this time, the cooling fan is operated at a regular speed when the amount of heating of the heater is between the first and second set values (Q1 and Q2).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
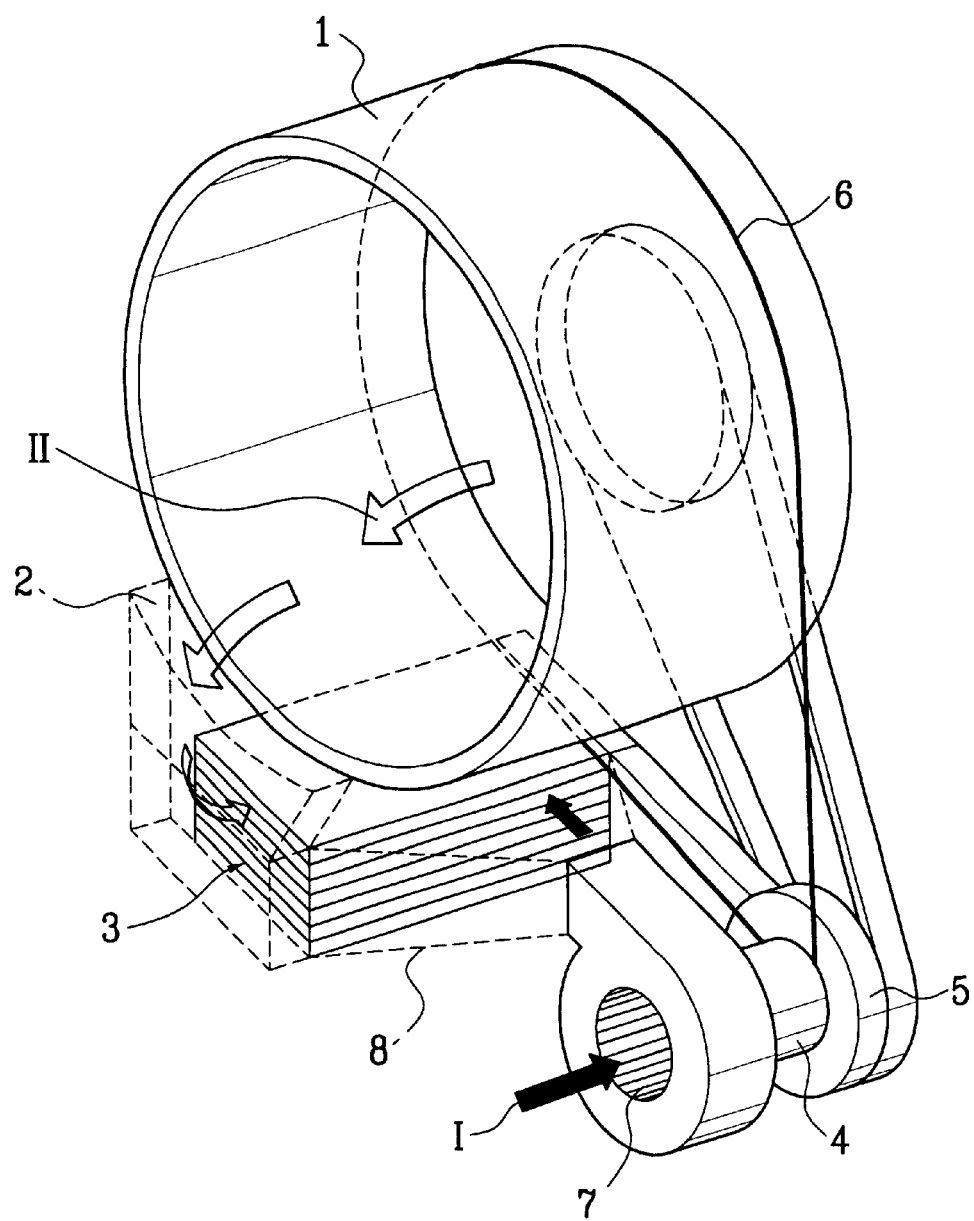
FIG. 1 is a perspective view illustrating a related art clothes dryer of a condensation type.
Figure 2:
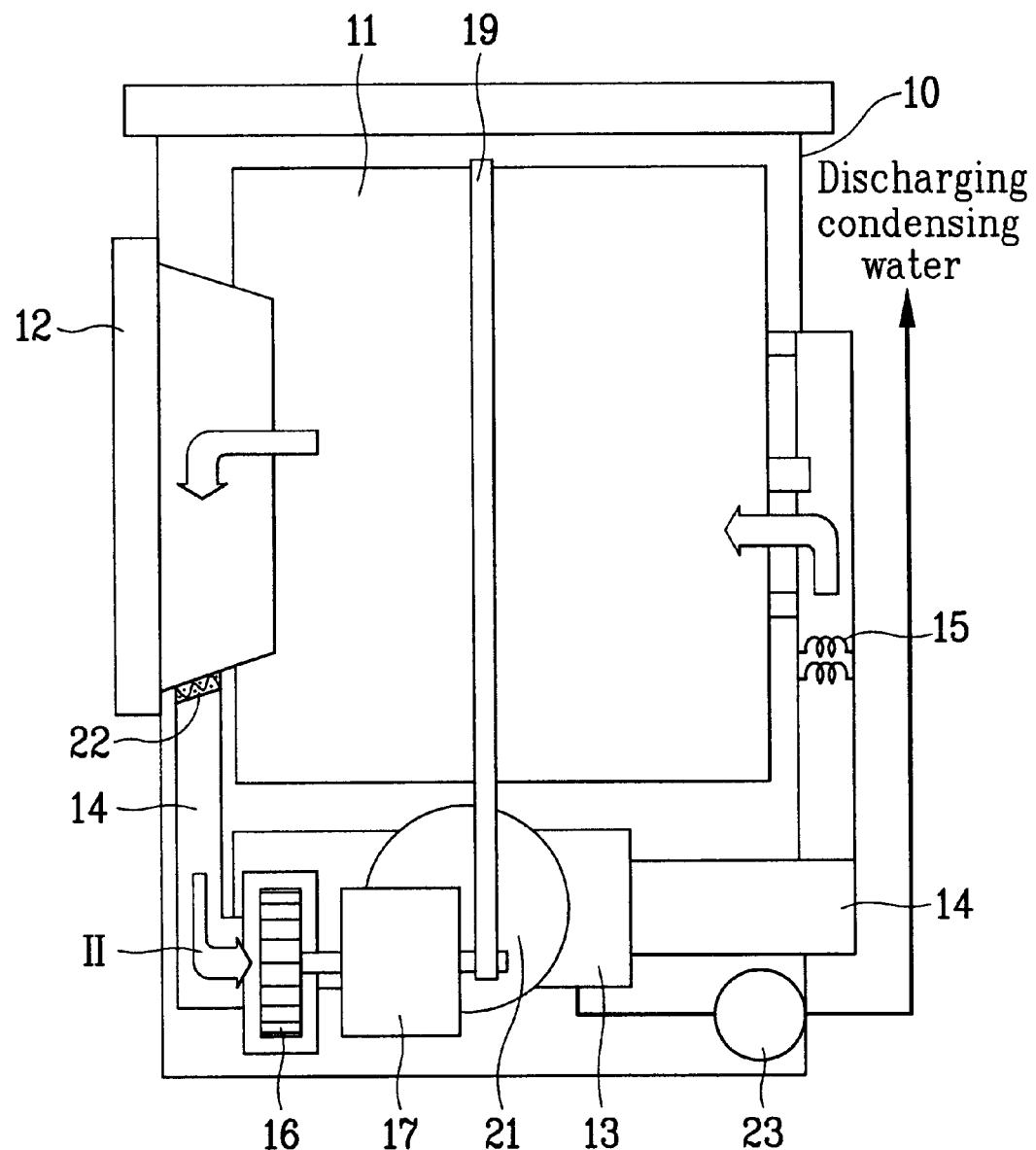
FIG. 2 is a longitudinal sectional view illustrating main parts of a condensation type clothes dryer in accordance with an embodiment of the present invention.
Figure 3:
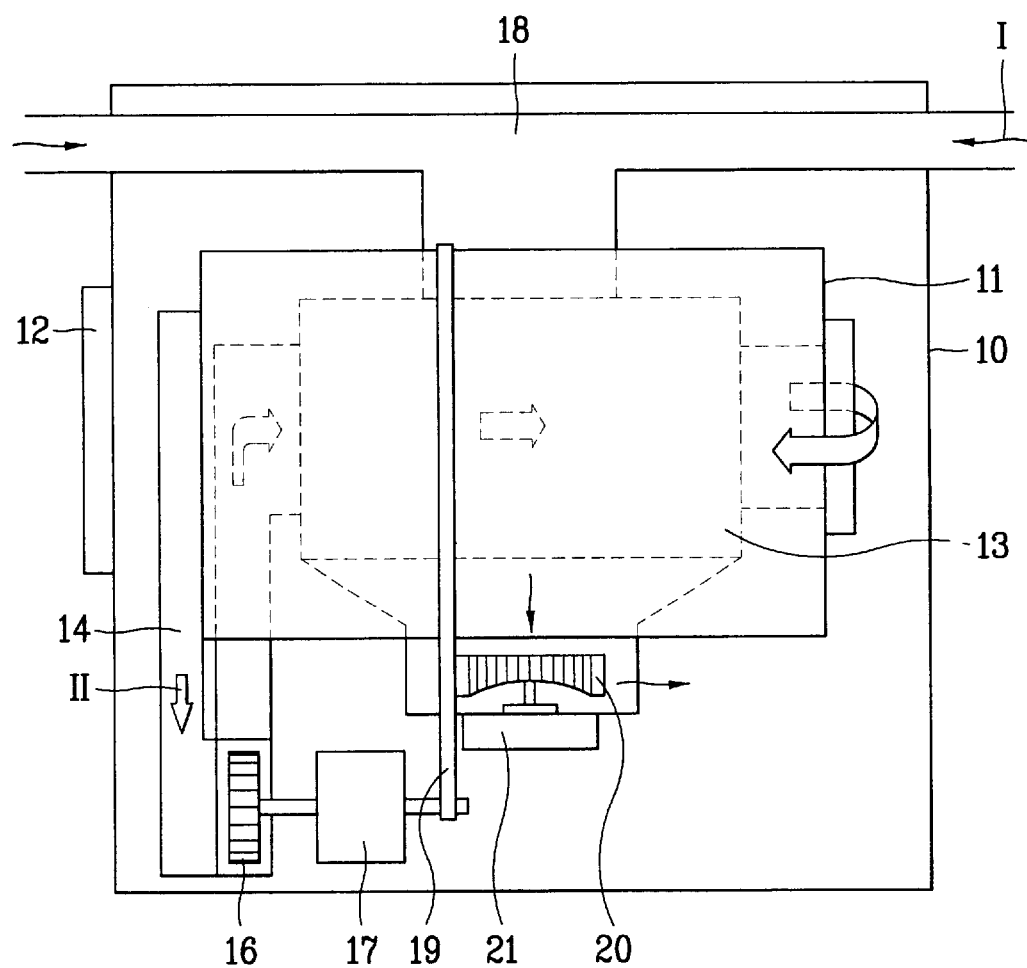
FIG. 3 is a cross sectional view illustrating the condensation type clothes dryer of FIG. 2.

A structure of a clothes dryer of the present invention will be described with reference to accompanying drawings. FIGS. 2 and 3 illustrate structures of a clothes dryer in accordance with the present invention. Referring to FIGS. 2 and 3, the arrow 'I' shows an external air flow and the arrow 'II' shows a circulating air flow.

As shown in FIGS. 2 and 3, a door 12 is provided on the front face of a cabinet 10. A drum 11 is rotatably provided in the cabinet 10. For this end, the drum 11 and the first motor 17 being provided in a lower portion inside space of the cabinet 10 are connected to each other with a belt 19. And the drum 11 has an air inlet and air outlet.

A condenser 13 being provided in a lower portion inside space of the cabinet condenses air of high humid, being generated in the drum 11 during a dry process, to make it dry. A circulation duct 14 for circulating air in the drum 11 connects the inlet and outlet of the drum 11 so as to make an air circulating passage. The condenser 13 is provided in the middle portion of the circulation duct 14. Accordingly, the air in the drum 11 flows through the circulation duct 14 and is introduced into the drum 11 again after passing through a condenser 13.

A heater 15 is formed in the circulation duct 14 and forms a hot blast by heating circulating air. As shown in FIG. 2, the heater 15 for heating the dry circulating air which passes through the condenser 13 is provided inside the circulation duct 14, in more detail, on a portion inside the circulation duct 14 adjacent to the inlet of the drum 11. Also, an amount of heating of the heater 15 can be controlled.

A circulation fan 16 being provided in the circulating duct circulates air inside the drum 11. The circulation fan 16, as shown in FIG. 2, is rotated by an action of a first motor 17. In the present invention, both of the drum 11 and circulation fan 16 are rotated by an operation of first motor 17. For this end, a shaft of the first motor 17 is drawn out from two sides of the first motor 17, which are respectively connected to the belt 19 and the circulation fan 16. But it is possible that two motors are provided for operating the drum 11 and circulation fan 16, respectively. It is obvious for the ordinary skilled in the art.

In the meantime, the condenser 13 should be provided with cold air from the exterior of the cabinet 10 for a heat exchange of humid air circulating through the circulation duct 14 and for condensation of it. For this end, an external air supply duct 18 is connected to one side of the condenser 13 and a cooling fan 20 is connected to the other side of the condenser 13. The cooling fan 20 sucks external air through the external air supply duct 18 and sends it to the condenser 13 for cooling the condenser 13. Also, a second motor 21 is provided to rotate the cooling fan 20.

The second motor 21 is a variable speed motor and as for it, a brushless direct current BLDC may be used. The second motor 21 being separately operated from the first motor 17 rotates the cooling fan 20 only.

The controller (not shown) generates independent control signals to the first and second motors (17 and 21), respectively, so as to control operation of the circulation fan 16 and cooling fan 20 independently.

In the present invention, a lint filter 22 may additionally be provided. As shown in FIG. 2, the lint filter 22 is provided inside the circulation duct 14 and filters off alien substances such as lint particles from the circulating air.

Also, a temperature sensor (not shown) being provided in the drum 11 may be further included to measure the temperature of air inside the drum 11. Also, the temperature sensor may be provided in the circulation duct 14 to measure the temperature of the circulating air.

Meanwhile a gutter (not shown) and a pump 23 further provided below the condenser 13. The gutter collects waterdrops being condensed during a condensation process. The pump 23 either discharges the waterdrops collected in the gutter to the exterior or guides the waterdrops to a condensing water tank (not shown) being formed in the cabinet 10.

A method for controlling an operation of a clothes dryer having the above-described structure will be described below.

First, a user puts a dry object into a drum 11 and operates the clothes dryer. As the clothes dryer starts operating, a first motor 17 and a heater 15 are operated. However, a second motor 21 is not operated during an initial operation process of the clothes dryer.

As the drum 11 and a circulation fan 16 are rotated, air inside the drum 11 is circulated through a circulation duct 14. And, the circulating air heated by the heater is introduced into the drum 11 after it passes through a condenser 13. At this time, as a cooling fan 20 is not rotated, cold external air is not sent to the condenser 13. Accordingly, in the present invention, heat loss is prevented because a heat exchange process does not have to be performed in the condenser 13 during the initial operation process. Therefore, in the present invention, operation of condenser 13 is delayed and the dry efficiency is improved.

Then, a second motor 21 is driven and thus the cooling fan 20 is rotated when one of the following conditions is met: when a predetermined period X of time, or when the temperature of circulating air reaches a predetermined degree.

To drive the second motor 21 when the predetermined period X of time passes, the period X of time required for the air circulating in the drum 11 to reach the predetermined temperature T should be set in a controller in advance.

Also, to drive the second motor 21 when the temperature of the circulating air reached the predetermined temperature T, the temperature of the air inside the drum 11 or the air being circulating should be measured by the temperature sensor being provided in the drum 11 or circulating duct 14. When the temperature reaches the predetermined degree T, the second motor 21 is operated.

When the cooling fan 20 is rotated, external air of the cabinet 10 is introduced through an external air supply duct 18 and then sent to the condenser 13 by the cooling fan 20 for a heat exchange process with the circulating air inside the condenser 13. Then, air of high humidity after a dry process in the drum 11 passes through the condenser 13 and exchanges heat to be condensed. The air of which moisture is eliminated is heated by the heater 15 and introduced into the drum 11 again. Along with that, the external air after the heat exchange process is discharged to the exterior of the cabinet 10 through a discharge hole (not shown) being formed on one side of the cabinet 10.

In the meantime, as amount of heating of the heater 15 are variable, the speed of the second motor 21 is controlled according the amount of heating of the heater 15. In this way, the dry process can be performed in the most suitable condition.

Figure 4:
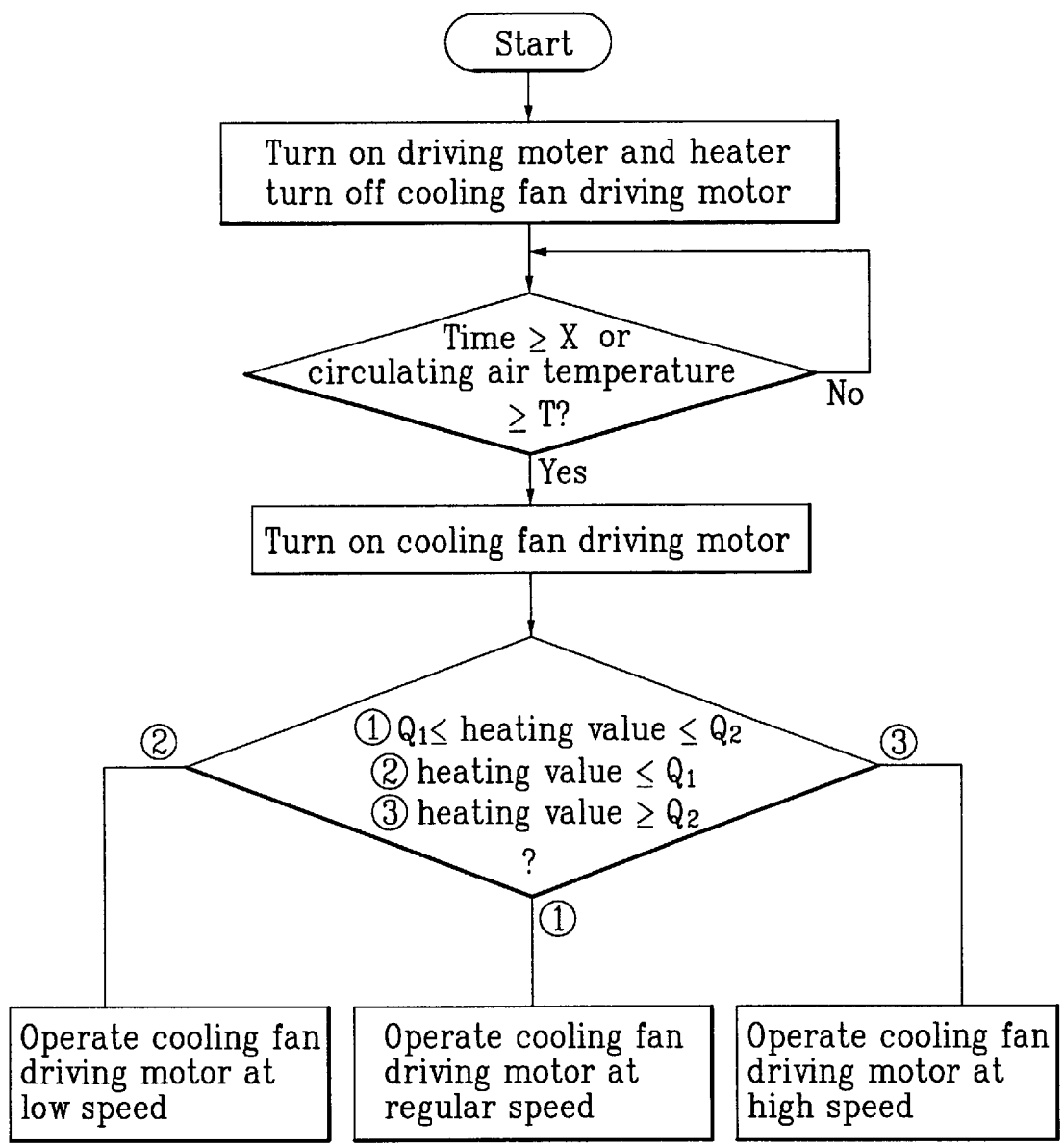
FIG. 4 is a flow chart for illustrating a method for controlling an operation of a clothes dryer in accordance with the first embodiment of the present invention.

That is, as shown in FIG. 4, if the heater 15 is operated when its amount of heating is the second set value Q2 and more, the second motor 21 is operated at a high speed. Accordingly, the amount of air flowing to the condenser 13 increases and in this way, a rapid dry process can be performed because condensing efficiency is improved. However, unpleasant noise during the operation is reduced as the second motor 21 is operated at a low speed when the amount of heating of the heater 15 is the first set value Q1 and less.

Also, the present invention can be realized by operating the heater 15 with its amount of heating between the first and second set values Q1 and Q2. In this case, the second motor 21 is operated at a regular speed.

Figure 5:
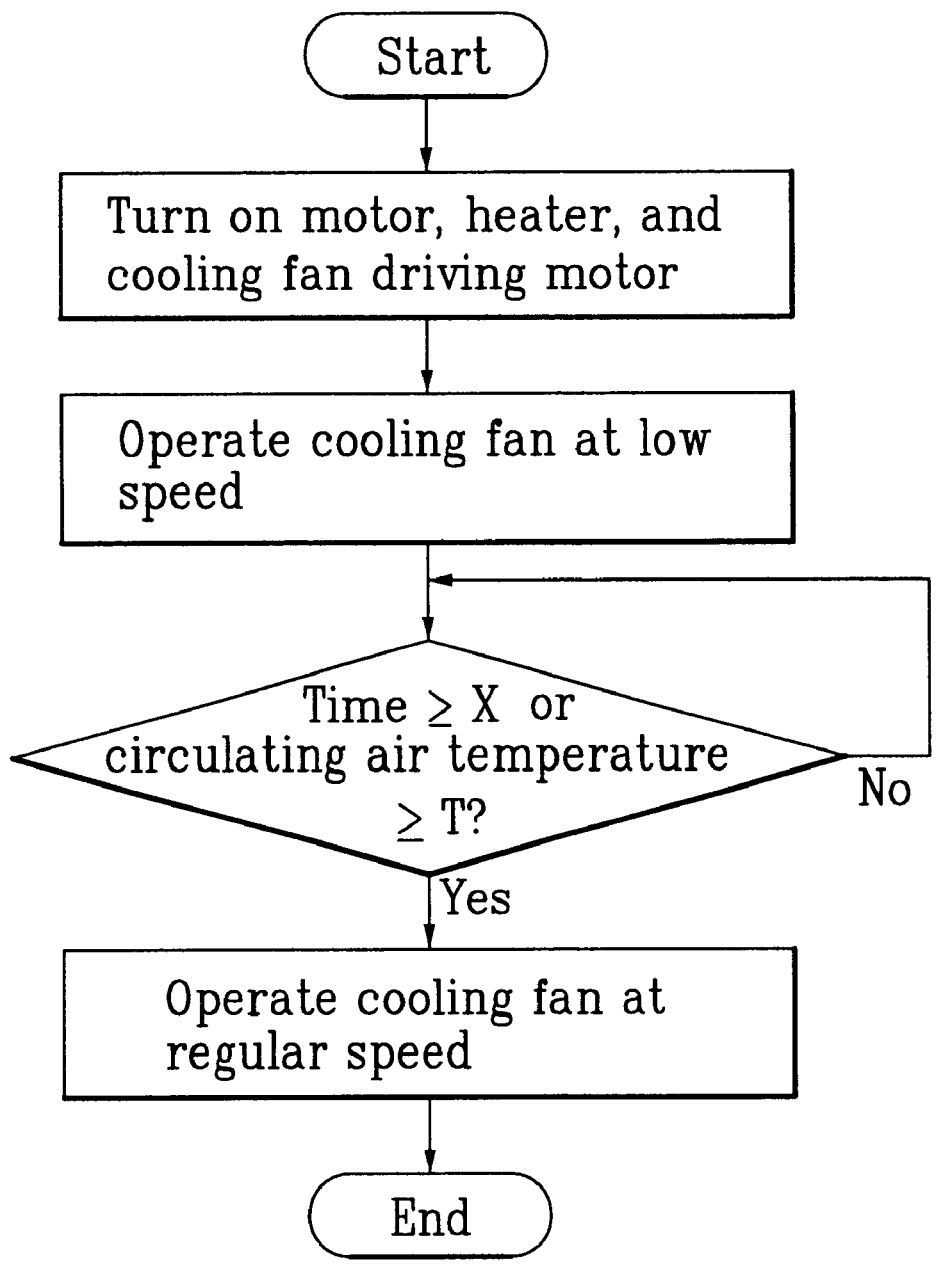
FIG. 5 is a flow chart for illustrating a method for controlling an operation of a clothes dryer in accordance with the second embodiment of the present invention.

FIG. 5 is a flow chart illustrating a method for controlling an operation of a clothes dryer in accordance with the second embodiment of the present invention. Back in FIG. 4, in the first embodiment of the present invention, a cooling fan 20 starts rotating when a predetermined condition is met after a clothes dryer being operated. In the second embodiment, however, a cooling fan 20 is rotated at a low speed at the same time as the operation of the clothes dryer. Then, the cooling fan 20 is rotated at a regular speed when a predetermined condition is met.

The second embodiment of the present invention will be briefly described with reference to FIG. 5.

First, a user puts a dry object into a drum 11 and operates a clothes dryer. As the clothes dryer is operated, a first motor 17, a heater 15, and a second motor 21 are operated. At this time, the second motor 21 and cooling fan 20 are operated at a low speed. As the cooling fan 20 is operated at a low speed, a little amount of external cold air is sent to a condenser 13. Accordingly, a heat loss, which is caused by heat exchange in the condenser during the early operation process, is reduced.

Then, when a predetermined condition is met during the operating of the clothes dryer, the cooling fan 20 is rotated at a regular speed. In other words, as shown in FIG. 5, if a predetermined period X of time passes or when the temperature of circulating air reaches a predetermined degree T, the cooling fan 20 starts rotating at a regular speed.

Of course, similar to the first embodiment shown in FIG. 4, after the cooling fan 20 is rotated at a regular speed, the driving speed of the second motor 21 can be varied according to amount of heating of the heater.

As have been described, a clothes dryer and a method for controlling its operation process have the following advantages.

First, as a cooling fan for sucking external air is separately operated from a drum or a circulation fan, a second motor can be operated at a low speed or does not have to be operated at all until circulating air during the initial operation of the clothes dryer comes to have high humidity. In this way, in the present invention, heat and energy losses are prevented, which were caused during the initial dry process of a related art clothes dryer. Accordingly, the circulating air easily reaches the preset temperature and thus, dry efficiency increases and energy is saved.

Second, as the driving speed of a second motor is variable, various operation control algorithms according to different heating values of a heater are realized.

Third, unpleasant noise during the operation is reduced as the second motor is operated at a low speed when the amount of heating of the heater is low.

It will be apparent to those skilled in the art that various modifications and variations can be made in the clothes dryer and the method for controlling operation of the clothes dryer of the present invention without departing from the spirit or scope of the invention. Thus, it is intended that the present invention cover the modifications and variations of this invention provided they come within the scope of the appended claims and their equivalents.

What is claimed is:

1. A method for controlling operation of a clothes dryer, the clothes dryer including a circulation fan for circulating air and a cooling fan being separately driven to cool down a condenser, the method comprising processes of:

simultaneously rotating the circulation fan and a drum, and operating a heater in a state of the cooling fan being stopped; and beginning to rotate the cooling fan after the rotation of the circulating fan and the drum is started, when a predetermined condition is met so as to delay operation of the condenser for improving drying efficiency.

2. The method of claim 1, wherein the cooling fan is rotated when a predetermined period of time passes.

3. The method of claim 1, wherein the amount of heating of the heater is variable.

4. A method of controlling operation of a clothes dryer, the clothes dryer including a circulation fan for circulating air and a cooling fan being separately driven to cool down a condenser, the method comprising processes of:

simultaneously rotating the circulation fan and a drum, and operating a heater in a state of the cooling fan being stopped; and beginning to rotate the cooling fan when a predetermined condition is met so as to delay operation of the condenser for improving drying efficiency, wherein the cooling fan is rotated when a temperature of circulating air reaches a predetermined degree.

5. A method of controlling operation of a clothes dryer, the clothes dryer including a circulation fan for circulating air and a cooling fan being separately driven to cool down a condenser, the method comprising processes of:

simultaneously rotating the circulation fan and a drum, and operating a heater in a state of the cooling fan being stopped; and beginning to rotate the cooling fan when a predetermined condition is met so as to delay operation of the condenser for improving drying efficiency, wherein the amount of heating of the heater is variable and the cooling fan is operated at a low speed when the amount of heating of the heater is a first set value (Q1) and less.

6. A method of controlling operation of a clothes dryer, the clothes dryer including a circulation fan for circulating air and a cooling fan being separately driven to cool down a condenser, the method comprising processes of:

simultaneously rotating the circulation fan and a drum, and operating a heater in a state of the cooling fan being stopped; and beginning to rotate the cooling fan when a predetermined condition is met so as to delay operation of the condenser for improving drying efficiency, wherein the amount of heating of the heater is variable and the cooling fan is operated at a high speed when the amount of heating of the heater is a second set value (Q2) and more.

7. A method of controlling operation of a clothes dryer, the clothes dryer including a circulation fan for circulating air and a cooling fan being separately driven to cool down a condenser, the method comprising processes of:

simultaneously rotating the circulation fan and a drum, and operating a heater in a state of the cooling fan being stopped; and beginning to rotate the cooling fan when a predetermined condition is met so as to delay operation of the condenser for improving drying efficiency, wherein the amount of heating of the heater is variable and the cooling fan is operated at a regular speed when the amount of heating is between the first and second set values (Q1 and Q2).

* * * * *